(12) United States Patent
Yang et al.

(10) Patent No.: US 9,018,329 B2
(45) Date of Patent: Apr. 28, 2015

(54) POLYMER COMPOSITIONS HAVING IMPROVED BARRIER PROPERTIES

(75) Inventors: Qing Yang, Bartlesville, OK (US); Mark L. Hlavinka, Bartlesville, OK (US); Guylaine St. Jean, Bartlesville, OK (US); Brooke A. Gill, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 142 days.

(21) Appl. No.: 13/224,775

(22) Filed: Sep. 2, 2011

(65) Prior Publication Data

US 2013/0059103 A1 Mar. 7, 2013

(51) Int. Cl.
*C08F 110/02* (2006.01)
*C08J 5/18* (2006.01)

(52) U.S. Cl.
CPC .......... *C08F 110/02* (2013.01); *Y10T 428/1397* (2015.01); *C08J 5/18* (2013.01); *C08J 2323/06* (2013.01)

(58) Field of Classification Search
CPC ............... C08F 110/02; C08F 2500/03; C08F 2500/062
USPC .................................... 526/352, 348; 528/396
See application file for complete search history.

(56) References Cited

U.S. PATENT DOCUMENTS

| | | | |
|---|---|---|---|
| 3,248,179 A | 4/1966 | Norwood | |
| 4,060,480 A | 11/1977 | Reed et al. | |
| 4,402,864 A | 9/1983 | McDaniel | |
| 4,452,910 A | 6/1984 | Hopkins et al. | |
| 4,501,885 A | 2/1985 | Sherk et al. | |
| 4,588,790 A | 5/1986 | Jenkins, III et al. | |
| 4,877,763 A | 10/1989 | McDaniel et al. | |
| 5,352,749 A | 10/1994 | DeChellis et al. | |
| 5,376,611 A | 12/1994 | Shveima | |
| 5,436,304 A | 7/1995 | Griffin et al. | |
| 5,455,314 A | 10/1995 | Burns et al. | |
| 5,501,887 A | 3/1996 | Tanaka et al. | |
| 5,502,112 A | 3/1996 | Peacock | |
| 5,565,175 A | 10/1996 | Hottovy et al. | |
| 5,575,979 A | 11/1996 | Hanson | |
| 6,107,230 A | 8/2000 | McDaniel et al. | |
| 6,165,929 A | 12/2000 | McDaniel et al. | |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel et al. | |
| 6,419,966 B1 * | 7/2002 | Davis ............................ | 426/106 |
| 6,432,496 B1 | 8/2002 | Klosiewicz | |
| 6,524,987 B1 | 2/2003 | Collins et al. | |
| 6,531,565 B2 * | 3/2003 | Kellum et al. ................. | 526/352 |
| 6,548,441 B1 | 4/2003 | McDaniel et al. | |
| 6,548,442 B1 | 4/2003 | Collins et al. | |
| 6,576,583 B1 | 6/2003 | McDaniel et al. | |
| 6,583,241 B1 | 6/2003 | Beach et al. | |
| 6,613,712 B1 | 9/2003 | McDaniel et al. | |
| 6,623,866 B2 | 9/2003 | Migliorini et al. | |
| 6,632,894 B1 | 10/2003 | McDaniel et al. | |
| 6,667,274 B1 | 12/2003 | Hawley et al. | |
| 6,689,857 B1 | 2/2004 | Larter et al. | |
| 6,750,302 B1 | 6/2004 | McDaniel et al. | |
| 6,765,048 B2 | 7/2004 | Dohrer et al. | |
| 6,770,712 B2 | 8/2004 | Golze et al. | |
| 6,831,032 B2 | 12/2004 | Spaether | |
| 6,833,415 B2 | 12/2004 | Kendrick et al. | |
| 6,930,071 B2 | 8/2005 | Knoeppel et al. | |
| 6,969,740 B2 | 11/2005 | Klosiewicz | |
| 6,984,698 B2 | 1/2006 | McLeod et al. | |
| 6,998,441 B2 | 2/2006 | Golze et al. | |
| 7,064,225 B2 | 6/2006 | Thorn et al. | |

(Continued)

FOREIGN PATENT DOCUMENTS

| | | | | |
|---|---|---|---|---|
| EP | 1138702 A1 | 10/2001 | | |
| WO | WO96/19527 | 6/1996 | | |
| WO | WO01/70827 | 9/2001 | | |
| WO | WO01/70828 | 9/2001 | | |
| WO | 2004002835 A2 | 1/2004 | | |
| WO | WO2010/098827 | 9/2010 | | |
| WO | WO 2011/004032 A1 * | 1/2011 | ............ | C08F 210/16 |
| WO | WO2011/133409 | 10/2011 | | |
| WO | WO2012/040144 | 3/2012 | | |
| WO | WO2012/040147 | 3/2012 | | |
| WO | 2013033689 A1 | 3/2013 | | |
| WO | 2013033689 A9 | 3/2013 | | |
| WO | 2013033690 A1 | 3/2013 | | |
| WO | 2013033696 A1 | 3/2013 | | |

OTHER PUBLICATIONS

Bird, R. Byron, et al., "Fluid Mechanics," Dynamics of Polymeric Liquids, vol. 1, Second Edition, 1987, cover page, publishing page, pp. xiii-xviii, and 171-172, John Wiley & Sons, Inc.
Chevron Phillips Chemical Company LP MSDS #240370 entitled "MarFlex® 9659 High Density Polyethylene," Jun. 2004, 1 page, MarFlex Polyethylene.

(Continued)

*Primary Examiner* — Rip A Lee
(74) *Attorney, Agent, or Firm* — Rodney B. Carroll; Cheryl L. Huseman; Conley Rose, P.C.

(57) ABSTRACT

A unimodal polymer having a melt index of from about 0.5 g/10 min to about 4 g/10 min, a density of equal to or greater than about 0.945 g/cc which when formed into a film displays a moisture vapor transmission rate of less than about 0.55 g-mil/100 in$^2$ in 24 hours as determined in accordance with ASTM F 1249. A unimodal polymer having a melt index of from about 0.5 g/10 min to about 4 g/10 min, a density of equal to or greater than about 0.945 g/cc which when formed into a film displays a moisture vapor transmission rate of less than about 0.44 g-mil/100 in$^2$ in 24 hours as determined in accordance with ASTM F 1249.

20 Claims, 2 Drawing Sheets

(56) References Cited

U.S. PATENT DOCUMENTS

| | | | |
|---|---|---|---|
| 7,176,259 | B1 | 2/2007 | Klosiewicz |
| 7,226,886 | B2 | 6/2007 | Jayaratne et al. |
| 7,312,283 | B2 | 12/2007 | Martin et al. |
| 7,449,530 | B2 | 11/2008 | Hagerty et al. |
| 7,517,939 | B2 | 4/2009 | Yang et al. |
| 7,632,907 | B2 | 12/2009 | Sukhadia et al. |
| 7,737,220 | B2 * | 6/2010 | Swabey et al. ............... 525/192 |
| 7,799,721 | B2 | 9/2010 | Yang et al. |
| 7,884,163 | B2 | 2/2011 | McDaniel et al. |
| 7,951,881 | B2 | 5/2011 | Sukhadia et al. |
| 7,956,139 | B2 | 6/2011 | Yang et al. |
| 7,960,487 | B2 | 6/2011 | Yang et al. |
| 8,067,518 | B2 | 11/2011 | Davey et al. |
| 8,076,421 | B2 * | 12/2011 | Kapur et al. ................. 525/240 |
| 8,580,895 | B2 * | 11/2013 | Standaert et al. ............. 525/240 |
| 2002/0020492 | A1 | 2/2002 | Nakamura et al. |
| 2003/0199657 | A1 | 10/2003 | Davis |
| 2005/0137342 | A1 | 6/2005 | Krishnaswamy et al. |
| 2006/0188678 | A1 | 8/2006 | Ohlsson et al. |
| 2009/0035545 | A1 | 2/2009 | Guenther et al. |
| 2009/0246491 | A1 | 10/2009 | Cortes |
| 2010/0035035 | A1 | 2/2010 | Defrang |
| 2010/0125114 | A1 | 5/2010 | Williams et al. |
| 2010/0210791 | A1 | 8/2010 | Bergstra et al. |
| 2010/0210797 | A1 * | 8/2010 | Gray et al. ..................... 526/90 |
| 2010/0221475 | A1 | 9/2010 | Sukhadia et al. |
| 2012/0058324 | A1 | 3/2012 | St. Jean et al. |
| 2012/0077665 | A1 * | 3/2012 | Ding et al. ..................... 502/62 |
| 2013/0059100 | A1 | 3/2013 | Hlavinka et al. |
| 2013/0059140 | A1 | 3/2013 | Hlavinka et al. |

OTHER PUBLICATIONS

Chevron Phillips Chemical Company LLC brochure entitled "MarFlex® 9659 High Density Polyethylene," www.ides.com, Jun. 2005, 1 page, IDES Prospector, The Plastics Web®.

Cotton, F. Albert, et al., Advanced Inorganic Chemistry, Sixth Edition, cover page, title page, and pp. ix-x, Mar. 30, 1999, John Wiley & Sons, Inc.

Equistar Chemicals, LP brochure entitled Alathon® M6210 High Density Polyethylene, 2003, 1 page, Lyondell Chemical Company.

Hawley's Condensed Chemical Dictionary, Eleventh Edition, 1987, cover page, contents page, and pp. 862-863, Van Nostrand Reinhold Company, New York.

Hieber, C. A., et al., "Shear-rate-dependence modeling of polymer melt viscosity," Jul. 1992, pp. 931-938, vol. 32, No. 14, Polymer Engineering and Science.

Hieber, C. A., et al., "Some correlations involving the shear viscosity of polystyrene melts," 1989, pp. 321-332, vol. 28, No. 4, Rheologica Acta.

IDES Product Comparison, Generic HDPE, www.ides.com, Feb. 23, 2010, 5 pages, IDES Prospector, The Plastics Web®.

Patent application entitled "Polymer compositions having improved barrier properties," by Mark L. Hlavinka, et al., filed Nov. 29, 2011 as U.S. Appl. No. 13/306,321.

Patent application entitled "Multilayer polymer films having improved barrier properties," by Mark L. Hlavinka, et al., filed Sep. 2, 2011 as U.S. Appl. No. 13/224,785.

Provisional patent application entitled "Polymer compositions having improved barrier properties," by Mark L. Hlavinka, et al., filed Sep. 2, 2011 as U.S. Appl. No. 61/530,711.

Pinnavaia, Thomas J., "Intercalated clay catalysts," Apr. 22, 1983, vol. 220, No. 4595, pp. 365-371, Science.

Thomas, J. M., "Sheet silicate intercalates: new agents for unusual chemical conversions," Intercalation Chemistry, 1982, Chapter 3, pp. 55-99, Academic Press, Inc.

International Patent Application PCT/US2012/053606 Search Report mailed Nov. 8, 2012.

Office Action dated Jan. 31, 2013, 30 pages, U.S. Appl. No. 13/224,785, filed on Sep. 2, 2011.

Filing receipt and specification for provisional patent application entitled "Polymer Compositions Having Improved Barrier Properties," by Mark L. Hlavinka, et al., filed Sep. 2, 2011 as U.S. Appl. No. 61/530,711.

Foreign communication from a related counterpart application— International Search Report and Written Opinion, PCT/US2012/035606, Nov. 8, 2012, 12 pages.

Foreign communication from a related counterpart application— International Preliminary Report on Patentability, PCT/US2012/053606, Mar. 4, 2014, 9 pages.

Foreign communication from a related counterpart application— International Search Report and Written Opinion, PCT/US2012/053608, Nov. 6, 2012, 8 pages.

Foreign communication from a related counterpart application— International Preliminary Report on Patentability, PCT/US2012/053608, Mar. 4, 2014, 6 pages.

Foreign communication from a related counterpart application— International Search Report and Written Opinion, PCT/US2012/053632, Nov. 28, 2012, 8 pages.

Foreign communication from a related counterpart application— International Preliminary Report on Patentability, PCT/US2012/053632, Mar. 4, 2014, 6 pages.

Office Action dated Oct. 1, 2013 (11 pages), U.S. Appl. No. 13/306,321, filed Nov. 29, 2011.

Office Communication dated Apr. 22, 2014 (4 pages), U.S. Appl. No. 13/306,321, filed Nov. 29, 2011.

Office Action (Final) dated Aug. 6, 2013 (25 pages), U.S. Appl. No. 13/224,785, filed Sep. 2, 2011.

Advisory Action dated Oct. 9, 2013 (4 pages), U.S. Appl. No. 13/224,785, filed Sep. 2, 2011.

Office Action dated Apr. 29, 2014 (23 pages), U.S. Appl. No. 13/224,785, filed Sep. 2, 2011.

Peacock, Andrew, "Handbook of Polyethylene: Structures, Properties, and Applications," 2000, 1 page, Marcel Dekker, Inc.

Office Action (Final) dated Sep. 23, 2014 (30 pages), U.S. Appl. No. 13/224,785, filed Sep. 2, 2011.

Office Communication dated Aug. 22, 2014 (5 pages), U.S. Appl. No. 13/306,321, filed Nov. 29, 2011.

ASTM Designation: F1249-13 entitled "Standard Test Method for Water Vapor Transmission Rate Through Plastic Film and Sheeting Using a Modulated Infrared Sensor," Nov. 2013, pp. 1-6, ASTM International.

Office Action (Final) dated Jan. 27, 2015 (47 pages), U.S. Appl. No. 13/306,321, filed Nov. 29, 2011.

Nova Chemicals, "SCLAIR polyethylene", NOVA Chemicals, Jul. 30, 2010 (p. 2, bottom right), 1-2.

McCormick and Tas, "Polyethylene Coextruded Blown Film: Layer Arrangement and Gloss" 2005 PLACE Conference, Sep. 26, 2005 (see p. 9 of Citation 2), pp. 1 to 18.

Dolan, "Nucleation of Polyethylene Blown Film", 2006 PLACE Conference, Sep. 17, 2006 (see p. 1 of Citation 3), pp. 1 to 14.

* cited by examiner

POLYMER COMPOSITIONS HAVING IMPROVED BARRIER PROPERTIES

CROSS-REFERENCE TO RELATED APPLICATIONS

The subject matter of the present application is related to U.S. Provisional Patent Application Ser. No. 61/530,711 filed on Sep. 2, 2011 and entitled "Polymer Compositions Having improved Barrier Properties," and Ser. No. 13/224,785 filed Sep. 2, 2011, published as US 2013/0059140 A1 and entitled "Multilayer Polymer Films Having Improved Barrier Properties," each of which is hereby incorporated herein by reference in its entirety for all purposes.

FIELD OF THE INVENTION

The present disclosure relates to polymeric compositions, more specifically polyethylene (PE) compositions, and articles made from same.

BACKGROUND OF THE INVENTION

Polyolefins are plastic materials useful for making a wide variety of valued products due to their combination of stiffness, ductility, barrier properties, temperature resistance, optical properties, availability, and low cost. One of the most valued products is plastic films. In particular, PE is the one of the largest volume polymers consumed in the world. It is a versatile polymer that offers high performance relative to other polymers and alternative materials such as glass, metal or paper. Plastic films such as PE films are mostly used in packaging applications but they also find utility in the agricultural, medical, and engineering fields.

PE films are manufactured in a variety of grades that are usually differentiated by the polymer density such that PE films can be designated for example, low density polyethylene (LDPE), linear low density polyethylene (LLDPE), medium density polyethylene (MDPE), and high density polyethylene (HDPE), wherein each density range has a unique combination of properties making it suitable for a particular application.

Despite the many positive attributes of PE, the film product remains permeable to gases such as oxygen or carbon dioxide and/or moisture (e.g., water). Thus, it would be desirable to develop a PE film product exhibiting improved bather properties.

SUMMARY OF THE INVENTION

Disclosed herein is a unimodal polymer having a melt index of from about 0.5 g/10 min to about 4 g/10 min, a density of equal to or greater than about 0.945 g/cc which when formed into a film displays a moisture vapor transmission rate of less than about 0.55 g-mil/100 in$^2$ in 24 hours as determined in accordance with ASTM F 1249.

Further disclosed herein is a unimodal polymer having a melt index of from about 0.5 g/10 min to about 4 g/10 min, a density of equal to or greater than about 0.945 g/cc which when formed into a film displays a moisture vapor transmission rate of less than about 0.44 g-mil/100 in$^2$ in 24 hours as determined in accordance with ASTM F 1249.

Also disclosed herein is a unimodal polymer having a melt index of from about 0.5 g/10 min to about 4 g/10 min, a density of equal to or greater than about 0.945 g/cc which when formed into a film displays a moisture vapor transmission rate of less than about 0.39 g-mil/100 in$^2$ in 24 hours as determined in accordance with ASTM F 1249.

DETAILED DESCRIPTION

Figure 1:
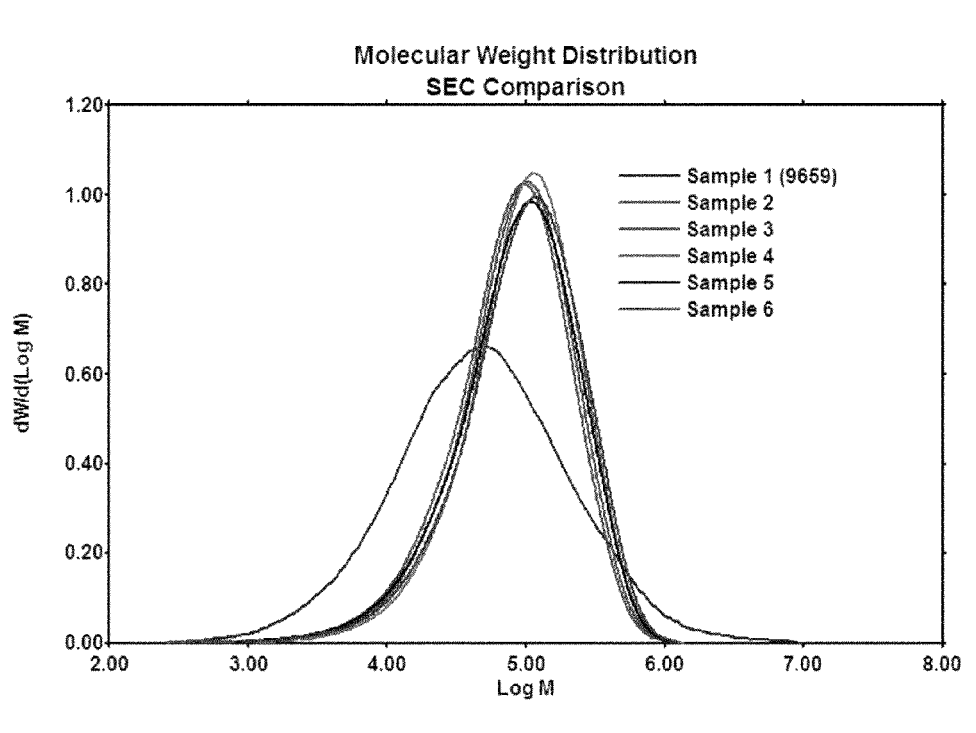
FIG. 1 is a graphical representation of molecular weight distribution profiles for the samples from Example 1.

Disclosed herein are polymers, polymeric compositions, polymeric articles, and methods of making same. The polymers and/or polymeric compositions of the present disclosure may comprise polyethylene. The polymers and/or polymeric compositions disclosed herein may comprise a blend of polymer components and result in a polymer and/or polymeric composition that unexpectedly displays improved barrier properties when compared to an otherwise similar polymeric composition prepared under different conditions In an embodiment, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to, density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In an embodiment, a method of preparing a polymer comprises contacting an olefin and/or alpha-olefin monomer with a catalyst system under conditions suitable for the formation of a polymer of the type described herein. In an embodiment, a catalyst composition for the production of a polymer of the type disclosed herein may comprise a single metallocene compound; an activator support, and an organoaluminum compound. Herein, the term "metallocene" describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

In an embodiment, the metallocene comprises a tightly-bridged ansa-metallocene compound comprising an olefin-containing moiety bonded to a cyclopentadienyl-type ligand and at least one aryl group bonded to the bridging atom of the bridging ligand. As used herein, the term bridged or ansa-metallocene refers simply to a metallocene compound in which the two $\eta^5$-cycloalkadienyl-type ligands in the molecule are linked by a bridging moiety. Useful ansa-metallocenes are typically "tightly-bridged", meaning that the two $\eta^5$-cycloalkadienyl-type ligands are connected by a bridging group wherein the shortest link of the bridging moiety between the $\eta^5$-cycloalkadienyl-type ligands is a single atom. Thus, the length of the bridge or the chain between the two $\eta^5$-cycloalkadienyl-type ligands is one atom, although this bridging atom is substituted. The metallocenes of this disclosure are therefore bridged bis($\eta^5$-cycloalkadienyl)-type compounds, wherein the $\eta^5$-cycloalkadienyl portions include substituted cyclopentadienyl ligands, substituted indenyl ligands, substituted fluorenyl ligands, and the like, wherein one substituent on these cyclopentadienyl-type ligands is a bridging group having the formula $ER^1R^2$, wherein E is a carbon atom, a silicon atom, a germanium atom, or a tin atom, and wherein E is bonded to both cyclopentadienyl-type ligands. In this aspect, $R^1$ and $R^2$ can be independently selected from an alkyl group or an aryl group, either of which having up to 12 carbon atoms, or hydrogen. A metallocene compound suitable for use in the present disclosure may display a positive hydrogen response. Herein, a positive hydrogen response refers to a lowering of the molecular weight. Examples of metallocene compounds suitable for use in the present disclosure are described in more detail in U.S. Pat. Nos. 7,064,225; 7,226,886 and 7,517,939, each of which is incorporated herein by reference in its entirety. In one aspect, the activator-support comprises a chemically-treated solid oxide. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the metallocene(s) in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this disclosure are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present disclosure, the solid oxide used to prepare the chemically-treated solid oxide has a pore volume greater than about 0.1 cc/g. According to another aspect of the present disclosure, the solid oxide has a pore volume greater than about 0.5 cc/g. According to yet another aspect of the present disclosure, the solid oxide has a pore volume greater than about 1.0 cc/g.

In another aspect, the solid oxide has a surface area of from about 100 m$^2$/g to about 1000 m$^2$/g. In yet another aspect, the solid oxide has a surface area of from about 200 m$^2$/g to about 800 m$^2$/g. In still another aspect of the present disclosure, the solid oxide has a surface area of from about 250 m$^2$/g to about 600 m$^2$/g.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11th Ed., John Wiley & Sons, 1995; Cotton, F. A., Wilkinson, G., Murillo, C. A., and Bochmann, M., Advanced Inorganic Chemistry, 6th Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $CO_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present disclosure include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this disclosure also encompasses oxide materials such as silica-coated alumina, as described in U.S. Pat. No. 7,884,163, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present disclosure, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present disclosure. It is contemplated that the electron-withdrawing anion can be, or can comprise, fluoride, chloride, bromide, phosphate, triflate, bisulfate, or sulfate, and the like, or any combination thereof, in some aspects of this disclosure. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) used in the catalyst compositions can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia; alternatively, comprises chlorided silica-zirconia; or alternatively, comprises fluorided silica-coated alumina.

When the electron-withdrawing component comprises a salt of an electron-withdrawing anion, the counterion or cation of that salt can be selected from any cation that allows the salt to revert or decompose back to the acid during calcining Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this disclosure is employing two or more electron-withdrawing anion source compounds in two or more separate contacting steps.

Thus, one example of such a process by which a chemically-treated solid oxide is prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

According to another aspect of the present disclosure, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Nonlimiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present disclosure. The chemically-treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare solid oxide activator-supports that can be employed in this disclosure have been reported. For example, such methods are described in U.S. Pat. Nos. 6,107,230; 6,165,929; 6,294,494; 6,300,271; 6,316,553; 6,355,594; 6,376,415; 6,388,017; 6,391,816; 6,395,666; 6,524,987; 6,548,441; 6,548,442; 6,576,583; 6,613,712; 6,632,894; 6,667,274; and 6,750,302; the disclosures of which are incorporated herein by reference in their entirety.

According to one aspect of the present disclosure, the solid oxide material is chemically-treated by contacting it with an electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present disclosure, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide (or solid oxides) with an electron-withdrawing anion source compound (or compounds) to form a first mixture; and 2) calcining the first mixture to form the solid oxide activator-support.

According to another aspect of the present disclosure, the solid oxide activator-support (chemically-treated solid oxide) is produced by a process comprising:

1) contacting a solid oxide (or solid oxides) with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present disclosure, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present disclosure, the solid oxide material is treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the disclosure include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining Silicon tetrafluoride ($SiF_4$) and compounds containing tetrafluoroborate ($BF_4^-$) also can be employed. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where the weight percent is based on the weight of the solid oxide, for example, silica-alumina, before calcining According to another aspect of this disclosure, the amount of fluoride or chloride ion present before calcining the solid oxide is from about 1 to about 25% by weight, and according to another aspect of this disclosure, from about 2 to about 20% by weight. According to yet another aspect of this disclosure, the amount of fluoride or chloride ion present before calcining the solid oxide is from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present disclosure, the pore volume is greater than about 0.8 cc/g, and according to another aspect of the present disclosure, greater than about 1.0 cc/g. Further, the silica-alumina generally has a surface area greater than about 100 $m^2$/g. According to another aspect of this disclosure, the surface area is greater than about 250 $m^2$/g. Yet, in another aspect, the surface area is greater than about 350 $m^2$/g.

The silica-alumina utilized in the present disclosure typically has an alumina content from about 5 to about 95% by weight. According to one aspect of this disclosure, the alumina content of the silica-alumina is from about 5 to about 50%, or from about 8% to about 30%, alumina by weight. In another aspect, high alumina content silica-alumina compounds can employed, in which the alumina content of these silica-alumina compounds typically ranges from about 60% to about 90%, or from about 65% to about 80%, alumina by weight. According to yet another aspect of this disclosure, the solid oxide component comprises alumina without silica, and according to another aspect of this disclosure, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present disclosure, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this disclosure, the amount of sulfate ion present before calcining is from about 0.5 to about 100 parts by weight sulfate ion to about 100 parts by weight solid oxide. According to another aspect of this disclosure, the amount of sulfate ion present before calcining is from about 1 to about 50 parts by weight sulfate ion to about 100 parts by weight solid oxide, and according to still another aspect of this disclosure, from about 5 to about 30 parts by weight sulfate ion to about 100 parts by weight solid oxide. These weight ratios are based on the weight of the solid oxide before calcining Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present disclosure, the activator-support used in preparing the catalyst compositions of this disclosure comprises an ion-exchangeable activator-support, including but not limited to silicate and aluminosilicate compounds or minerals, either with layered or non-layered structures, and combinations thereof. In another aspect of this disclosure, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present disclosure, the activator-support of this disclosure comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the metallocene component.

According to another aspect of the present disclosure, the clay materials of this disclosure encompass materials either in their natural state or that have been treated with various ions by wetting, ion exchange, or pillaring. Typically, the clay material activator-support of this disclosure comprises clays that have been ion exchanged with large cations, including polynuclear, highly charged metal complex cations. However, the clay material activator-supports of this disclosure also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present disclosure, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present disclosure can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this disclosure.

The activator-support used to prepare the catalyst compositions of the present disclosure can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

The process of making these activator-supports may include precipitation, coprecipitation, impregnation, gelation, pore-gelation, calcining (at up to 900° C.), spray-drying, flash-drying, rotary drying and calcining, milling, sieving, and similar operations.

In an embodiment, an organoaluminum compound suitable for use in the present disclosure comprises an alkylaluminum compound. For example, the organoaluminum compound may comprise a trialkylaluminum compound, having the general formula AlR$_3$. Nonlimiting examples of trialkylaluminum compounds suitable for use in this disclosure include triisobutylaluminum (TiBA or TiBAl); tri-n-butylaluminum (TNBA); tri-octly-butylaluminum (TOBA); tri-ethylaluminum (TEA); and/or other appropriate alkyl-aluminum complexes, and combinations thereof. Additionally, partially hydrolyzed alkylaluminum compounds and/or aluminoxanes, may be used. In an embodiment, the organoaluminum compound comprises a compound represented by the general formula:

$$Al(X^5)_p(X^6)_q$$

where $X^5$ is a halide, hydrocarbyloxide group, hydrocarbylamino group or combinations thereof; $X^6$ is a hydrocarbyl group having up to 18 carbon atom; p ranges from 0 to 2; and q is 3−p.

In an embodiment, the catalysts are chosen from compounds like those represented by the chemical structures MTE-A and MTE-B.

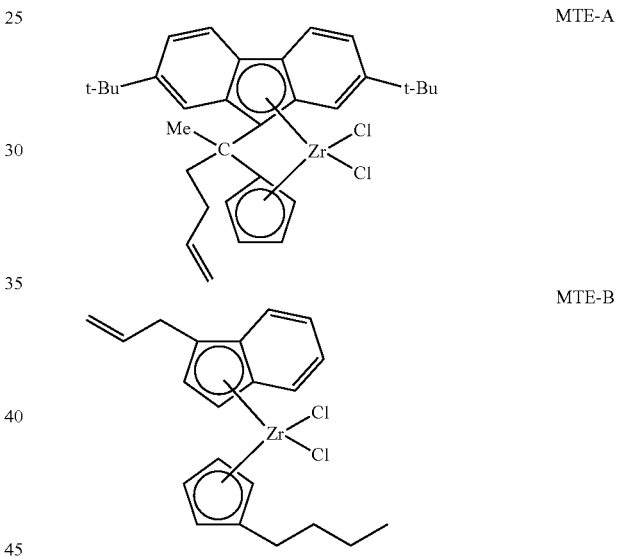

In an embodiment, a catalyst system suitable for use in the present disclosure comprises a metallocene compound (e.g., MTE-A), an activator support (e.g., sulfated alumina); and an organoaluminum compound (e.g., TIBA).

The polymer may include other additives. Examples of additives include, but are not limited to, antistatic agents, colorants, stabilizers, nucleators, surface modifiers, pigments, slip agents, antiblocks, tackafiers, polymer processing aids, and combinations thereof. Such additives may be used singularly or in combination and may be included in the polymer before, during, or after preparation of the polymer as described herein. Such additives may be added via any suitable technique, for example during an extrusion or compounding step such as during pelletization or subsequent processing into an end use article.

In an embodiment, a monomer (e.g., ethylene) is polymerized using the methodologies disclosed herein to produce a polymer of the type disclosed herein. The polymer may comprise a homopolymer. In an embodiment, the polymer is a homopolymer. It is to be understood that an inconsequential amount of comonomer may be present in the polymers disclosed herein and the polymer still be considered a homopolymer. Herein, an inconsequential amount of a comonomer refers to an amount that does not substantively affect the properties of the polymer disclosed herein. For example, a comonomer can be present in an amount of less than about 0.5 wt. %, 0.1 wt. %, or 0.01 wt. % based on the total weight of polymer.

In an embodiment, a polymer of the type described herein is characterized by a density of equal to or greater than about 0.945 g/cc, alternatively greater than about 0.950 g/cc, alternatively greater than about 0.955 g/cc, or alternatively greater than about 0.960 g/cc as determined in accordance with ASTM D 1505.

In an embodiment, a polymer of the type described herein is a unimodal resin. Herein, the "modality" of a polymer resin refers to the form of its molecular weight distribution curve, i.e. the appearance of the graph of the polymer weight fraction as a function of its molecular weight. The polymer weight fraction refers to the weight fraction of molecules of a given size. A polymer having a molecular weight distribution curve showing a single peak may be referred to as a unimodal polymer, a polymer having curve showing two distinct peaks may be referred to as bimodal polymer, a polymer having a curve showing three distinct peaks may be referred to as trimodal polymer, etc. Polymer modality can be determined using any suitable methodology such as those described in the examples sections herein.

In an embodiment, a polymer of the type described herein has a weight average molecular weight ($M_w$) of from about 80 kg/mol to about 200 kg/mol; alternatively of from about 90 kg/mol to about 175 kg/mol; or alternatively of from about 100 kg/mol to about 150 kg/mol. The weight average molecular weight describes the molecular weight distribution of a polymer and is calculated according to equation 1:

$$M_w = \frac{\sum_i N_i M_i^2}{\sum_i N_i M_i} \quad (1)$$

where $N_i$ is the number of molecules at molecular weight $M_i$.

A polymer of the type described herein may be characterized by molecular weight distribution (MWD) of from about 2 to about 5, alternatively from about 2 to about 4.5, or alternatively from about 2 to about 4. The MWD is the ratio of the $M_w$ to the number average molecular weight ($M_n$), which is also referred to as the polydispersity index (PDI) or more simply as polydispersity. The number average molecular weight is the common average of the molecular weights of the individual polymers and may be calculated according to equation (2) where $N_i$ is the number of molecules at molecular weight $M_i$.

$$M_n = \frac{\sum_i N_i M_i}{\sum_i N_i} \quad (2)$$

A polymer of the type described herein may be further characterized by a ratio of z-average molecular weight ($M_z$) to $M_w$ ($M_z/M_w$) of less than about 4, alternatively less than about 3.5, or alternatively less than about 3. The z-average molecular weight is a higher order molecular weight average which is calculated according to equation (3)

$$M_z = \Sigma_i N_i M_i^3 / \Sigma_i N_i M_i^2 \quad (3)$$

where $N_i$ is the number of molecules at molecular weight $M_i$. The ratio of $M_z/M_w$ is another indication of the breadth of the MWD of a polymer.

In an embodiment, a polymer of the type described herein has a melt index, MI, in the range of from about 0.5 grams per 10 minutes (g/10 min) to about 4.0 g/10 min, alternatively from about 0.7 g/10 min to about 3.0 g/10 min, or alternatively from about 0.75 g/10 min to about 2.75 g/10 min, or alternatively from about 0.8 g/10 min to about 1.8 g/10 min. The melt index (MI) refers to the amount of a polymer which can be forced through a melt indexer orifice of 0.0825 inch diameter when subjected to a force of 2160 grams in ten minutes at 190° C., as determined in accordance with ASTM D 1238.

Polymers of the type disclosed herein may be formed into articles of manufacture or end-use articles using any suitable technique such as blown and cast film extrusion, blow molding, injection molding, fiber spinning, thermoforming.

In an embodiment, polymers of the type described herein disclosed are fabricated into a film. The films of this disclosure may be produced by any suitable method and under any suitable condition for the production of films. In an embodiment, the polymers are formed into films through a blown film process. In a blown film process, plastic melt is extruded through an annular die, usually vertically, to form a walled tube. The size of the bubble is a function of the blow-up ratio that is controlled by air introduced at the die. The bubble then moves upwards until it passes through nip rolls where the tube is flattened to create what is known as a lay-flat film. This lay-flat or collapsed tube is then collected on a cardboard roll. Crystallization of the polymer continues in the film up to 48 hours after the process. On higher output lines, fresh air is continuously introduced inside the bubble, allowing for greater output rates. This manner of cooling the bubble is known as Internal Bubble Cooling (IBC).

Typically, the blow-up ratio between die and blown bubble would be 1.5 to 4 times the die diameter. The drawdown between the melt wall thickness and the cooled film thickness occurs in both radial and longitudinal directions and is easily controlled by changing the volume of air inside the bubble and by altering the take off speed of the line. The films formed from polymer resins of this disclosure (e.g., polyethylene) may be of any thickness desired by the user. Alternatively, the polymers this disclosure may be formed into films having a thickness of from about 0.1 mils to about 5 mils, alternatively from about 0.2 mils to about 2 mils, alternatively from about 0.3 mils to about 1.65 mils.

In an embodiment, films formed from polymers of this disclosure may display enhanced barrier properties. For example, said films may display a reduced moisture vapor transmission rates (MVTR).

In an embodiment, 1-mil monolayer films produced from polymers of this disclosure have an MVTR of less than or equal to about 0.55 grams-mil per 100 square inch per day (g-mil/100 in$^2$/day), alternatively less than or equal to about 0.44 g-mil/100 in$^2$/day, or alternatively less than or equal to about 0.39 g-mil/100 in$^2$/day as measured in accordance with ASTM F 1249. The MVTR measures passage of gaseous H$_2$O through a bather. The MVTR may also be referred to as the water vapor transmission rate (WVTR). Typically, the MVTR is measured in a special chamber, divided vertically by the substrate/barrier material. A dry atmosphere is in one chamber, and a moist atmosphere is in the other. A 24-hour test is run to see how much moisture passes through the substrate/barrier from the "wet" chamber to the "dry" chamber under conditions which can specify any one of five combinations of temperature and humidity in the "wet" chamber. The lower the transmission rate, the better is the film at blocking moisture.

In an embodiment, monolayer films formed from polymers of this disclosure may display improved optical properties. For example, said films may display reduced haze. Generally haze refers to the cloudy appearance of a material cause by light scattered from within the material or from its surface. Herein, the values of haze disclosed refer to the percentage of transmitted light that scatters or deviates from an incident beam by more than 2.5° (angle degrees). The haze of a material can be determined in accordance with ASTM D1003 for a haze percentage of equal to or lower than 30%. A material having a haze percentage of greater than 30% can be determined in accordance with ASTM E167. In an embodiment, 1-mil films produced from polymers of the type described herein have a haze percentage of less about 45%, alternatively less than about 35%, or alternatively less than about 25% for a density of 0.949 g/cc or greater.

The films produced from polymers of this disclosure may be used in the formation of any variety of end-use articles. These end-use articles may include without limitation merchandise bags, t-shirt bags, trash can liners, grocery sacks, produce bags, food packaging for contents such as cereals, crackers, cheese, meat, etc., shrink wrap and, other items. Other nonlimiting examples of end-use articles include containers, cups, trays, pallets, toys, or a component of another product. In an embodiment the polymers disclosed herein (e.g., polyethylene) may be formed into films which can be useful in food packaging.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner. The following testing procedures were used to evaluate the various polymers and compositions.

Melt index (MI, g/10 min) was determined in accordance with ASTM D 1238 condition E at 190° C. with a 2160 gram weight.

Polymer density was determined in grams per cubic centimeter (g/cc) on a compression molded sample, cooled at about 15° C. per hour, and conditioned for about 40 hours at room temperature in accordance with ASTM D 1505 and ASTM D 1928, procedure C.

Molecular weight and molecular weight distributions were obtained using a PL-GPC 220 (Polymer Labs, an Agilent Company) system equipped with a IR4 detector (Polymer Char, Spain) and three Styragel HMW-6E GPC columns (Waters, M A) running at 145° C. The flow rate of the mobile phase 1,2,4-trichlorobenzene (TCB) that contains 0.5 g/L 2,6-di-t-butyl-4-methylphenol (BHT) was set at 1 mL/min and the concentration of polymer solutions was generally kept in the range of 1.0-1.5 mg/mL, depending on the molecular weight. Sample preparation was conducted at 150° C. for nominally 4 h with occasional and gentle agitation before the solutions being transferred to sample vials for injection. The integral calibration method was used to deduce molecular weights and molecular weight distributions using a Chevron Phillips Chemicals Company's HDPE polyethylene resin, MARLEX BHB5003, as the broad standard. The integral table of the broad standard was pre-determined in a separate experiment with SEC-MALS.

Rheology measurements were made as follows: Strains were generally maintained at a single value throughout a frequency sweep, but larger strain values were used for low viscosity samples to maintain a measurable torque. Smaller strain values were used for high viscosity samples to avoid overloading the torque transducer and to keep within the linear viscoelasitc limits of the sample. The instrument automatically reduces the strain at high frequencies if necessary to keep from overloading the torque transducer. These data were fit to the Carreau-Yasuda equation to determine zero shear viscosity ($\eta_0$), relaxation time ($\tau$), and a measure of the breadth of the relaxation time distribution (CY-a). The Carreau-Yasuda (CY) model is represented by equation (4):

$$E = E_o[1 + (T_\xi \dot{\gamma})^a]^{\frac{n-1}{a}} \quad (4)$$

where
E=viscosity (Pa·s)
$\dot{\gamma}$=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region].

To facilitate model fitting, the power law constant n is held at a constant value. Details of the significance and interpretation of the CY model and derived parameters may be found in: C. A. Hieber and H. H. Chiang, Rheol. Acta, 28, 321 (1989); C. A. Hieber and H. H. Chiang, Polym. Eng. Sci., 32, 931 (1992); and R. B. Bird, R. C. Armstrong and O. Hasseger, Dynamics of Polymeric Liquids, Volume 1, Fluid Mechanics, 2nd Edition, John Wiley & Sons (1987), each of which is incorporated by reference herein in its entirety.

MVTR and haze were measured in accordance with ASTM F 1249 and ASTM D-1003 respectively. Haze measurements were determined with a haze-gard plus from BYK-Gardner or equivalent.

Example 1

Figure 2:
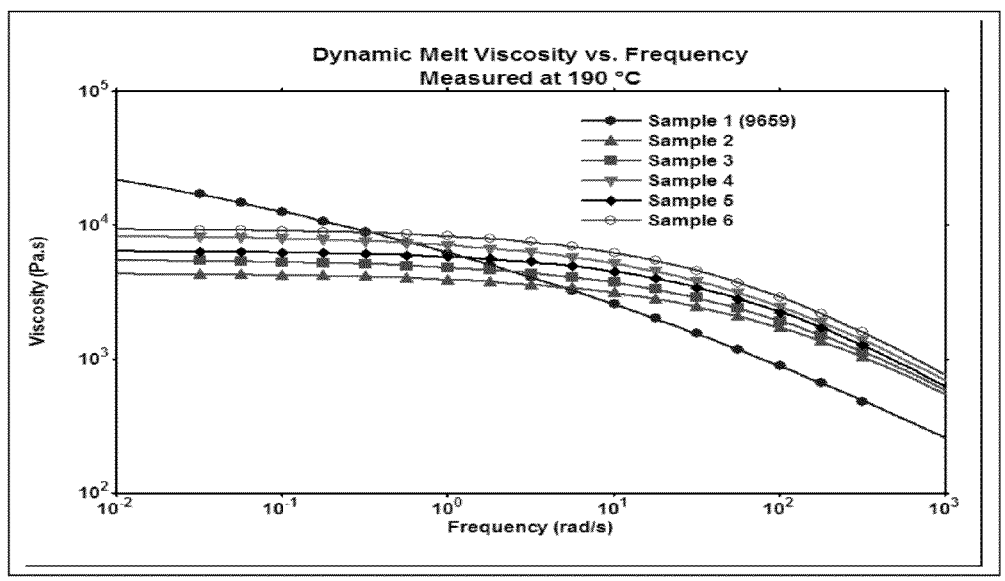
FIG. 2 is a plot of the dynamic melt viscosity as a function of frequency for the samples from Example 1.

Polymers of the type described herein were prepared using a catalyst system comprising a single metallocene complex (e.g., MTE-A or MTE-B), a solid oxide (e.g., sulfated alumina) and an organoaluminum compound (e.g., tri-isobutylaluminum (Tiba)). Specifically 5 samples, designated Samples 2-6, of polyethylene homopolymers were prepared as disclosed herein. Various polymer properties were assessed and the results are presented in Table 1. Also shown are the values for a comparative polyethylene resin MARLEX 9659 which is a high density polyethylene commercially available from Chevron Phillips Chemical Company LP. The molecular weight distribution profiles and a plot of the dynamic melt viscosity as a function of frequency for the samples are presented in FIGS. 1 and 2, respectively.

TABLE 1

| Sample No. | 1 | 2 | 3 | 4 | 5 | 6 |
| --- | --- | --- | --- | --- | --- | --- |
| Catalyst | Marlex 9659 | MTE-A | MTE-A | MTE-A | MTE-B | MTE-B |
| Melt Index (g/10 min) | 1.0 | 1.8 | 1.3 | 0.9 | 1.2 | 0.9 |
| Density (g/cc) | 0.9649 | 0.9513 | 0.9509 | 0.9491 | 0.9588 | 0.9579 |
| Haze % (1 mil) | 45.5 | 17.2 | 14.4 | 11.0 | 23.3 | 19.9 |
| $M_n$ (kg/mol) | 16 | 35 | 36 | 53 | 43 | 48 |

TABLE 1-continued

| Sample No. | 1 | 2 | 3 | 4 | 5 | 6 |
|---|---|---|---|---|---|---|
| $M_w$ (kg/mol) | 144 | 115 | 123 | 137 | 129 | 140 |
| $M_z$ | 1259 | 213 | 227 | 248 | 240 | 257 |
| $M_w/M_n$ | 8.8 | 3.2 | 3.4 | 2.6 | 3.0 | 2.9 |
| $M_z/M_w$ | 8.8 | 1.9 | 1.9 | 1.8 | 1.9 | 1.8 |
| $\eta_0$ (Pa-s) | 9.5E+04 | 4.3E+03 | 5.4E+03 | 8.5E+03 | 6.5E+03 | 9.4E+03 |
| $\tau_0$ (s) | 0.1470 | 0.0073 | 0.0092 | 0.0134 | 0.0121 | 0.0157 |
| CY-a | 0.1649 | 0.5351 | 0.5238 | 0.5196 | 0.5853 | 0.5832 |
| MVTR g-mil/100 in$^2$/day, 90% RH LLDPE blown film mode, 1 mil | 0.56 | 0.35 | 0.38 | 0.47 | 0.39 | 0.38 |

While embodiments of the invention have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

What is claimed is:

1. A unimodal homopolymer having a melt index of from about 0.5 g/10 min to about 4 g/10 min, a density of equal to or greater than about 0.945 g/cc, a ratio of z-average molecular weight to weight average molecular weight ($M_z/M_w$) of less than about 3.5 and a weight average molecular weight of from about 80 kg/mol to about 200 kg/mol which when formed into a 1 mil film displays a moisture vapor transmission rate of less than about 0.55 g-mil/100 in$^2$ in 24 hours as determined in accordance with ASTM F 1249 and a haze of less than about 40% as determined in accordance with ASTM D 1003.

2. The homopolymer of claim 1 having a molecular weight distribution of from about 2 to about 5.

3. The homopolymer of claim 1 which comprises polyethylene.

4. The homopolymer of claim 1 having a density of greater than about 0.955 g/cc as determined in accordance with ASTM D 1505.

5. A film formed from the homopolymer of claim 1.

6. A food packaging container comprising the film of claim 5.

7. A blown film formed from the homopolymer of claim 1.

8. A blown film formed from the homopolymer of claim 4.

9. The blown film of claim 8 having a haze percentage of less than about 35% as determined in accordance with ASTM D 1003.

10. A unimodal homopolymer having a melt index of from about 0.5 g/10 min to about 4 g/10 min, a density of equal to or greater than about 0.945 g/cc, a ratio of z-average molecular weight to weight average molecular weight ($M_z/M_w$) of less than about 3.5 and a weight average molecular weight of from about 80 kg/mol to about 200 kg/mol which when formed into a 1 mil film displays a moisture vapor transmission rate of less than about 0.44 g-mil/100 in$^2$ in 24 hours as determined in accordance with ASTM F 1249 and a haze of less than about 40% as determined in accordance with ASTM D 1003.

11. The homopolymer of claim 10 having a molecular weight distribution of from about 2 to about 5.

12. The homopolymer of claim 10 which comprises a polymer of ethylene.

13. A film formed from the homopolymer of claim 10.

14. A food packaging container comprising the film of claim 13.

15. A blown film formed from the homopolymer of claim 10.

16. A unimodal homopolymer having a melt index of from about 0.5 g/10 min to about 4 g/10 min, a density of equal to or greater than about 0.945 g/cc, a ratio of z-average molecular weight to weight average molecular weight ($M_z/M_w$) of less than about 3.5 and a weight average molecular weight of from about 80 kg/mol to about 200 kg/mol which when formed into a 1 mil film displays a moisture vapor transmission rate of less than about 0.39 g-mil/100 in$^2$ in 24 hours as determined in accordance with ASTM F 1249 and a haze of less than about 40% as determined in accordance with ASTM D 1003.

17. The homopolymer of claim 16 having a molecular weight distribution of from about 2 to about 5.

18. A film formed from the homopolymer of claim 16.

19. A food packaging container comprising the film of claim 18.

20. A blown film formed from the homopolymer of claim 16.

* * * * *